Patented Dec. 18, 1923.

1,477,810

UNITED STATES PATENT OFFICE.

CHARLES JAMES CRAWFORD, OF ST. LOUIS, MISSOURI.

PROCESS FOR MANUFACTURING NEW AND IMPROVED HIGH REFRACTORY.

No Drawing.  Application filed August 14, 1923. Serial No. 657,459.

*To all whom it may concern:*

Be it known that I, CHARLES JAMES CRAWFORD, a citizen of the United States, residing at St. Louis and State of Missouri, have invented certain new and useful Improvements in Processes for Manufacturing New and Improved High Refractory, of which the following is a specification, reference being had therein to the accompanying drawings.

This invention relates to a process for manufacturing new and improved high refractories. The problems in the manufacture and use of high refractories are scientific according to the chemical reactions involved. These refractories deal with every industry in which heat, the greatest of all forces, is used. The initial cost of refractory products is rapidly increased by additions of freight, handling labor, labor in erection, labor in tearing down burned out furnaces and loss of output by reason of time lost in furnace repairs. A basic open hearth furnace roof as now constructed lasts for about two hundred heats or from sixty to ninety days. The cost to industry involved in the items mentioned runs into the hundreds of millions of dollars annually. Better refractories and consequently longer furnace life is therefore a most desirable economic development. The refractories industry as a whole has continued to follow methods of antiquity developed generations ago and little or no improvement has been made or even attempted in either the quality of its product or in economies of manufacture.

I have found that in order to obtain most efficient results in any type of refractories structures, that the component brick of which said structure is constructed, when maximum results are desired, must have the greatest possible strength. This is contrary to many theories and practices now followed. Many of the refractory products now marketed are coarsely ground, excessively filled with voids insufficiently burned, and are of low physical strength. In other words they have laid all stress on the refractory value of the product and have largely ignored the factor of structural strength. Ninety-five per cent of all the silica brick manufactured in the U. S. at the present time are made of the Medina quartz of Pennsylvania, and the red jasper quartzite of Wisconsin. I find occurring in the Wabash River Valley in Indiana, and in Vermilion, Fountain, and Warren Counties of said State, an argillaceous silica material known as millstone grit. I find that much of this material is better suited to the manufacture of silica brick than either the Medina quartz or Wisconsin quartzite. The physical properties of this material permit of easier grinding. Their geographical location with respect to Western manufacture is such that very great economies could be effected in the saving of freight expense on raw material as compared to the long haul from the Baraboo districts of Wisconsin to points of manufacture in the Chicago district. I find there are extensive deposits of like materials conveniently located in Pennsylvania.

In the practice of my invention in the use of this material in the manufacture of silica brick, I reduce the millstone grit to a degree of fineness where all of it will pass a number twenty mesh screen. Incident to the grinding, two per cent milk of lime is added and the mass tempered with sufficient water to keep down silica dust which is so deadly to human life, the mixture thus ground is allowed to stand until the lime has stiffened the mass in its process of setting, this next step is an important part of my invention. Ninety per cent of all silica brick now manufactured are made by hand labor which is both wastefully extravagant, and the cause of many deficiencies and failures in silica brick structures. The brick are commonly uneven, and generally imperfect, irregular in construction and loosely put together.

The reason for this long continued following of hand made methods has been due to many causes among which is that silica material is so highly abrasive in its nature that if fed to many types of brick making machinery it would so rapidly wear the machines that the cost of maintenance of these types of machines would be prohibitive. Many attempts to use standard mould type machines, such as a dry press have been unsuccessful because of the tendency of the material to pack, thereby leaving corners and edges unfilled, making imperfect brick. Further, where the mud mass was taken directly from the grinding machine to the press, the pressure exerted by the brick press in the formation of the brick expelled the milk of lime so necessary as a bonding agent, the resultant product would therefore be unbounded when burned. In the practice of my invention when the material has started setting as above related, the material is passed through a suitable screen of approximately one-eighth or three-sixteenths mesh, the screen being located in such position that the screened material falls over such feeding devices as are usually standard on a dry press, rotary press, or soft mud machine. The material when thus loosely divided and separated has an increased volume and is less abrasive and becomes a spongy mass with such "give" or plasticity that it will perfectly fill the moulds of a brick machine and produce, with sufficient pressure, strong silica brick, which when dried, and burned produces a brick of most superior qualities, as the following tests made at Mellon Institute, Pittsburgh, Pa., and the works of the Hadfield-Penfield Steel Company will prove:

| Tests. | My brick. | Average Penna. |
|---|---|---|
| End cold crushing strength in pds. per sq. in.* | 4,460 | 1,200 to 1,500 |
| Modulus of rupture in pds. per sq. in.* | 640 | 270 to 300 |
| Porosity * | 35.10 | |
| | 35.30 | |
| | 34.85 | |
| See Bulletin No. 116, Bureau of Standards, page 41, for porosity and sp. g. of Medina and Baraboo brick. | | |
| Medina porosity | 26.70 | |
| Baraboo porosity | 26.43 | |
| Specific gravity *— | | |
| Medina sp. g. | 2.37 | 2.396 |
| Baraboo sp. g. | 2.39 | 2.435 |
| Behavior in 1500° C. load test* | Expanded under load. | |
| Behavior in spalling test heated to 540° C. Nesbitt and Bell method ten dips in water, loss (30 per cent loss permitted under this test.) | 19% loss | |

* Results by Mellon Institute.

Analysis of this brick made by Mellon Institute is as follows:

Silica _____ 94.56
Alumina _____ 1.06
Iron oxide _____ 0.75
Titania _____ 0.23
Lime _____ 2.83
Magnesia _____ 0.27
Alkalies _____ 0.88

This brick has a fusion point ranging from cone 31 to cone 32.

An analysis of burned brick made of this same material made subsequent to the above analysis shows the presence of phosphorus to be .085. Analysis by Frank Stone, chemist.

The above results have conclusively proven that due to the fine grinding I have produced a brick of most extraordinary cold crushing strength and high porosity, by mechanical methods, which brick is perfect in structure and uniformity and capable of production at greatly lessened cost for reasons above stated.

I have found in southern Illinois and eastern, also southeastern Missouri deposits of amorphous silica consisting of weathered or broken down chert (nouvaculite) which when treated in the same manner that I have hereinbefore described in the use of millstone grit, yielded equal results. In some of these deposits I have noted the presence of phosphorus, no doubt in combination with the impurities.

I find that all of these materials, as described, are more readily converted to tridymite by the use of catalyzers than either the Baraboo or Medina quartz.

An important phase of the development of this invention lies in the production of a brick of fixed volume suitable for use in constructing the linings of open hearth furnaces, coke ovens and the like, which brick will be free of objectionable spalling, cracking or breaking and will be of constant volume irrespective of the changes of temperature to which it is subjected.

My improved brick neither expands nor contracts under changes of temperature but maintains a constant volume under heat. In addition, its constituent elements are such that it does not increase in volume when being manufactured but, upon the contrary, the burned brick is of exactly the same size that the green brick was before it was burned, so that in the process of manufacture the brick is free of the extreme atomic and molecular torsional strains which have heretofore resulted in spalling and checking and cracking of these brick during the process of manufacture and even after they are built into the furnace structure constituting a part of the lining thereof.

See Technologic Papers of the Bureau of Standards—#124, by Herbert Insley and A. A. Klein, Constitution and microstructur of silica brick, and changes involved through repeated burnings at high temperatures. Issued July 11, 1919, Washington, D. C., page 4.

"During the burning mineralogical changes occur in which minerals of lower density are formed, and this results in a permanent expansion of the brick. If the conditions are such that these changes have progressed but little during the initial burning of the brick, it is quite certain that if these brick be used in metallurgical operations where they are subjected to high temperatures further expansion will take place. Buckling and cracking of restrained silica-brick walls as a result of expansion are by no means unknown and are of serious consequences. It has therefore been the aim of the silica-brick manufacturer to 'take out the expansion,' as he terms it."

It is a well established fact that the expansion that takes place in a silica brick is due to the gradual conversion of the quartz crystals of which silica brick is originally made to the allotropic forms of silica of lower density or specific gravity known as cristobalite and tridymite.

The apparent specific gravity of quartz is 2.65; that of cristobalite 2.32 to 2.33; and the tridymite 2.26 to 2.27. These lower specific gravities have ordinarily been obtained only by long and continued periods of high heats. In fact the period of heating was so extended, sometimes running into several months, that the production of a true tridymite brick upon a commercial basis has heretofore been looked upon as an impossiblity.

The spalling, checking and cracking of silica brick in a furnace structure to a certain extent may be due to structural strains but these strains are greatly increased by the torsional strains of expansion which occur during the atomic and molecular conversion in the changing of the crystal structure of quartz to its allotropic forms cristobalite and tridymite.

I have found that the presence of a small percentage of phosphorus $P_2O_5$, varying from .03 to .25 in certain amphorous forms of unburned silica material no doubt present in combination with the iron and alkalies, lime, magnesia and alumina when made into a silica brick with the usual 2% of milk of lime bond and burned to 2700° F. produces a shaky silica brick with an apparent specific gravity of 2.26. With the use of other silica material that contained no phosphorus I have found that by adding .50 of $P_2O_5$ the brick could, by a relatively short period of burning, be converted into a product having an apparent specific gravity of 2.26 with a completely altered structure showing the twin-crystals characteristic of tridymite and some cristobalite. However, in this case the brick which was 8⅝ inches in length in a green state had expanded to 9¼ inches in a burned state and the resultant product was of no commercial value whatever, lacking structural strength and being badly cracked and shaky. This condition was created by the torsional strains set up in the material during the conversions to cristobalite and tridymite.

I have found that in burning a kiln of silica brick in which one-half of the brick had received, in addition to the usual 2% of milk of lime, an addition of one-half of one percent $P_2O_5$ and the other half of the brick in the kiln contained only the milk of lime, when burned, the brick to which the phosphorus had been added had an apparent specific gravity of 2.26, while the other half of the brick in the kiln which contained no phosphorus but had been burned in the kiln of which one-half of the brick contained phosphorus, as stated, had an apparent specific gravity of 2.30. The same silica material when burned in the regular commercial way with 2% of lime bond in many previous burns show an apparent specific gravity ranging from 2.37 to 2.39. The result of this research was conclusive of the fact that where the atmosphere of a kiln in which silica brick is being burned contained phosphorus the results are the same as though the phosphorus were added to the brick. It is an established fact in metallurgy, both in the manufacture of ferro phosphorus and phosphoric acid, that if phosphate of lime or phosphate rock (apatite) is mixed with a flux of silica in the presence of carbon and under high heat the silica and the lime combine and the phosphorus is volatilized or given off. Following out this well established principle, if silica brick bonded with 2% of lime are in an atmosphere surcharged with phosphorus gas the phosphorus action as a catalyzer is even faster and more effective than if added to the brick. The phosphorus gas thus released seeks its affinities found in the green brick as lime, alumina, magnesia, alkalies and iron. When the brick has reached a temperature sufficiently high to combine the lime, alumina and alkalies with the silica, the introduction of phosphorus gas having been discontinued, it will then give off the phosphorus with which it was previously saturated, and the amount of phosphorus remaining in the brick will be that taken up by the iron present in the green brick. In the practice of this method of introducing phosphorus, small piles of phosphate rock, silica sand and crushed coke when placed around the flash walls or at various points within the kiln or in a specially provided fire-box, or phosphate rock and silica or other commercial forms of phosphorus can be shoveled into the fire-box in small quantities as firing progresses, or in any manner by which there may be maintained in the kiln an atmosphere surcharged with phosphorus gas and carbon. I find the catalyzing action is best developed under reducing conditions of burning, and when conversion is about completed the change of burning conditions to oxidizing with increased heat will then volatilize, and carry off the catalyzer. I find that the operation can by the use of this and other catalyzers be volatilized in the manner as described, promote the catalyzing action with greater speed and with lower relative heats than by any other method. In other words the invention is not restricted to the use of any particular flux or catalyzer but is intended to include, broadly, the subjection of the silica material to the action of a catalyzer consisting of a gas or vapor. While I have found the phosphorus gas and carbon to be highly efficient for the purpose set forth, I contemplate using sodium tungstate, salts and compounds of boric acid, tungstate acid, trioxide of sulphur, molybdic acid, phosgene gas, sodium chloride, etc. I find that the extremely porous brick as hereinbefore described are very rapidly converted. It is apparent on the face of it that the gaseous catalyzer can more readily and completely reach all parts of a porous mass than would be the case with dense and lumpy pieces of silica material.

Many attempts to convert the tridymite into a merchantable brick using milk of lime, sulphate of lime (plaster of Paris), fresh silica material, etc., did not produce a satisfactory product.

See page 25, Technologic Papers of the Bureau of Standards, No. 124, above referred to.

"The greater the amount of flux in the brick the more quickly will the silica be changed into the end product of inversion. It has been found, however, that the addition of lime above 6 or 8 percent greatly depresses the softening temperature of the brick."

See also page 26 of Bulletin No. 124.

"Most of the bonding action ('of a silica brick') of the brick seems to come from the interlocking of the cristobalite and tridymite crystals."

Where a silica brick has been expanded to the limit of expansion the natural bond has been destroyed and it is held together merely by the interlocking of the weakened and spent crystals.

It is obvious that a silica brick converted to tridymite is of such weakened physical structure as to be unfitted for any commercial purpose. To utilize these expanded and spent crystals of tridymite following the usual method of a lime bond requires such an excessive amount of lime to bond these crystals that it lowered the softening and the fusing points thereby greatly impairing the refractory value.

I have discovered that alumina is the proper bond for these expanded and spent crystals of tridymite.

See page 12, Technologic Papers of the Bureau of Standards, #116, Silica refractories, by Donald W. Ross, assistant ceramic chemist, issued April 19, 1919, Washington, D. C.

" In the ternary system $CaO-Al_2O_3-SiO_2$ the region near pure $SiO_2$ shows that for the percentages of CaO and $Al_2O_3$ under consideration, the melting point gradually increases as we pass from CaO to $Al_2O_3$."

A further point of superiority of the brick of my invention lies in the fact that the bonding element, namely; alumina as found in a high grade flint fire clay has a higher fusion point than the silica material itself. I have observed that in proportions in which I have used this bonding agent that it toughens the brick under heat. Alumina tenaciously grips and binds together silica, the strongest of all refractories substances which has been relieved of its characteristic family disturbance, and freed of torsional strains is now able to exert its strength to the limit of its refractories value in a fixed volume. In a perfect structure unaffected by bonding agents whose nature is to flux and soften whereas, the bond of alumina is of even higher refractories value than silica itself, and of the same acid nature.

I finally discovered, and this constitutes a most important feature of my invention, that flint fire clay of 42-44% of alumina content and 50-54% silica having a fusion point ranging from cone #33 to #35 (3250° F. to 3326° F.) which has been reduced to pass a quarter mesh screen and had been soaked in water and thoroughly weathered and completely broken down in structure until it had been brought to a satisfactory colloidal condition giving it the necessary plastic qualities, constituted an agent which when mixed with the tridymite gave a brick having most desirable characteristics.

In carrying out the invention the flint clay was kept in a moist condition and subjected to the action of the atmosphere so that it could gradually become "weathered." I found that when so treated flint clay has greater uniformity and it could be brought to a condition of plasticity which could not be effected by any amount of grinding or pugging of an unweathered clay. During the weathering of this clay it gradually went to pieces, the various lumps checking and cracking and breaking up into innumerable smaller pieces so that when this flint clay was finally to be used it could without difficulty be brought by pugging or panning to a colloidal condition necessary to plasticity as above set forth. After the flint clay had been brought to this plastic condition, a mixture was made containing 12% of this weathered flint clay and 88% of the cracked and broken tridymite brick which had been produced with relatively short burning as above described and the two were ground thoroughly together with sufficient water to bring the whole to a plastic mass. This mass was molded into fire brick under sufficient pressure to make it a strong and perfectly molded product. The mold was 8⅜ inches by 4¼ inches and the green brick were burned to cone 12-2498° F. (1420° C.) and the resulting product was an unusually strong tridymite brick absolutely free of checking, spalling or cracking, the burned brick being of the same identical size that the green brick were before burning. This is a remarkable and unprecedented result in that it provides a silica fire brick of great structural strength which neither expands or contracts even under wide variations in temperature and long continued heating.

It is the alumina in the flint clay that constitutes the bonding agent for the tridymite and cristobalite and produces the highly satisfactory results above set forth. I find it is of great advantage to introduce the alumina through the medium of a flint clay because the flint clay has a higher fusing point as well as greater strength than the ordinary plastic clays heretofore employed as bonding agent, in the making of a quartzite brick. Thus by the use of a flint clay I secure the double advantage of introducing the necessary alumina and of employing a bonding agent which increases the fusing point of the resulting product. In conjunction with this I have developed a method of breaking down the hard, high alumina flint clays and converting them into a plastic state. This I accomplish by the preliminary weathering above recited.

I have found that certain silica materials which contain $P_2O_5$ in their natural state will readily convert to a product with an apparent specific gravity of 2.26, this being the specific gravity of tridymite. I contemplate the employment of these natural silica deposits in the manufacture of silica brick and without the step of adding $P_2O_5$ in the manufacture of the brick.

Furthermore my invention is not restricted to the employment of tridymite produced by the particular method set forth but covers rather the treatment of any tridymite base material irrespective of the method by which it is produced by the addition of a clay of high alumina content and particularly flint clay by virtue of which I am able to produce a hard, smooth, dense product free of any cracks and breaks and having the advantages hereinbefore recited. However it is a fact that tridymite produced by my particular method has advantages over any known tridymite with which I am familiar, produced by any other method, in that by my method I am able to produce a tridymite markedly free from fluxes of any nature which would tend to reduce the fusing point of the product. I know that various mixtures of fire clay and silica (gannister) have been employed in making a quartzite brick or other fire brick products or refractories, including cement, but as these clays are invariably of lower fusing point or less refractory value and soften at lower heats than silica or gannister, the mixtures above referred to have not been found to have any practical value. However, by my method of weathering the hard flint fire clay as described, I have employed a bonding agent of much higher fusing point than that of silica or gannister or quartz and have therefore improved the refractory values of the same beyond that of any mixture employing these ingredients. A weathered flint fire clay, such as kaolinite reduced to a colloidal state of plasticity, as described, can be run in a stiff mud auger machine and made into a first quality fire clay brick composed of 100% flint fire clay, thus doing away with the standard practice of using bonding clays with the flint clay, and improving the first quality flint fire clay brick.

I am aware of the fact that United States Patent No. 1,420,284 issued to Orazio Rebuffat of Naples, Italy, disclosed a process of manufacturing a tridymite or cristobalite brick. However, the present invention goes beyond the process of Rebuffat in that it adds those steps necessary to cure the evils of checking, spalling and cracking which are the necessary results of the torsional strains produced in the initial stages of manufacture, wherein the process consists of a single burning of a silica brick containing $P_2O_5$. By my process of making a fixed volume silica brick for refractory purposes the brick is burned twice as follows:

The silica is burned once in the presence of a catalyst which may be $P_2O_5$ or otherwise and is thus converted into tridymite or cristobalite or the like. The resultant product is, as before stated, reduced and mixed with the plastic bonding elements of high alumina content, such as a flint clay, and is burned again.

In consideration of the problems involved in this discovery or invention I recognize a difference between a catalyzer and a flux; while both are in a sense agents of conversion a flux becomes and remains a component part of the process either in the product itself or a by-product; while a catalyzer which is also an agent of conversion may not appear in the result of the process or if it appears at all may by subsequent or after treatment be wholly eliminated from the products or if permitted to remain exercises a negligible fluxing action.

While I have, in my experiments, burned the silica in the first burning in the form of a brick, it is of course apparent that if the material is thereafter ground, pugged, or otherwise reduced prior to the second burning, this first burning may be carried out with the material in any form. In other words, the material may be in the form of flat cakes, elongated strips or rolls, small or large granules or otherwise. Furthermore it is to be understood that the invention is not limited to the exact percentages of flint clay and silica employed. I mention those percentages merely because I have found them to give satisfactory results. I have also had satisfactory results in the use of other percentages and I contemplate varying the percentages of the two materials, silica and flint clay, within wide ranges.

This invention covers not only brick but standard sizes, tile special shapes and cements made from this material common and usual to the refractories industry and it is to be understood that in the construction of the claims of this patent that this broad meaning is to be given to the term "brick."

By virtue of the invention described herein it is now possible to make larger sized units, larger pieces, larger bricks, than has ever heretofore been possible. I believe that complete arch sections, are well within the range of possibility.

It is my belief that the breaking down and disintegration of the millstone grits, nouvaculite and chert mentioned above is largely brought about by the phosphorus found in these natural deposits. I am confirmed in this belief by the fact that phosphorus and silica are more or less incompatible, one being an acid and the other being basic in its affinities. Thus it is my theory and belief that the occurrence of the materials named along with phosphorus results in the gradual disintegration of the former. I have previously stated that it is the alumina content of the flint clay which gives this material its marked value as a bonding agent and I have stated that the flint clay that I have employed has an alumina content of 42% to 44%. However, it is manifest that it is only necessary to employ a clay having an alumina content sufficient to secure the desired bonding action, since, given the understanding that a clay of high alumina content will secure the desired results anyone skilled in the art will readily appreciate that clays other than flint clays may be secured having a high alumina content. Among these may be mentioned kaolin or kaolinites. I also contemplate the use of bauxite. High alumina clays are well recognized in the art. They are those clays recognized as being suitable for use in the manufacture of first quality fire clay brick, having a fusing point above cone #32 and having an alumina content of 35% or more. Thus by "high alumina content" may be understood an alumina content of 35% or over. In determining which material will be used the relative difficulty of obtaining the same, the cost of handling and production, their freedom from objectionable fluxing materials or impurities, etc. will be balanced against their alumina content and the engineer will select the material found to be most desirable when these several factors are taken into consideration. However for all around excellence of results, I consider the flint clay to be the most desirable material to use.

The omission of, and failure to mention many steps and details of and incidental to this process of manufacture such as are generally usual and necessary in the manufacture of refractories, as for example, grinding, moulding, drying, setting, burning, etc., was done in the interest of brevity, and any such omission shall be without prejudice.

Having described my invention, what I claim is:

1. A silica brick consisting of tridymite bonded with a clay of high alumina content.

2. A silica brick consisting of a mixture of tridymite and a bonding agent having an alumina content.

3. A silica brick consisting of tridymite and flint clay of high alumina content.

4. The herein described method of manufacturing a fixed volume high refractory brick which consists of having a silica to convert it to tridymite, mixing with said tridymite a bonding agent having a higher fusing point than the tridymite and reburning said tridymite and bonding agent in intimate admixture with each other, the fusing point of the completed brick being not lower than that of tridymite.

5. The herein described method of manufacturing a fixed volume high refractory brick which consists of burning a silica to convert it to tridymite, bonding said tridymite with an agent of high alumina content and reburning the tridymite and bonding agent in intimate admixture with each other.

6. The herein described method of manufacturing a fixed volume high refractory silica brick which consists in combining tridymite formed by burning silica to the limit of expansion in the presence of a catalyst and reduced to a divided condition with a bonding agent of alumina content and burning said tridymite and said bonding agent in intimate admixture with each other.

7. The herein described method of making a fixed volume silica brick for use as a fire brick which consists of burning a silica material under such conditions as to reduce its apparent specific gravity to approximately 2.26 to 2.33, reducing said material to finely divided form, mixing said material with a bonding agent having a high alumina content and then reburning the whole.

8. The herein described method of making a fixed volume silica brick for use as a fire brick which consists of burning a silica material under such conditions as to reduce its apparent specific gravity to approximately 2.26 to 2.33, reducing said material to finely divided form, mixing said material with flint clay having a high alumina content and then reburning the whole.

9. The herein described method of manufacturing a fixed volume high refractory brick which consists of converting a silica material to tridymite, weathering a hard flint clay, reducing said clay to a colloidal condition by mechanical means, reducing the tridymite to divided form, mixing the flint clay and tridymite and then burning the whole.

10. The herein described method of manufacturing a fixed volume high refractory brick which consists of burning a silica to convert it to tridymite, intimately mixing the tridymite with a flint clay and then reburning the tridymite and flint clay in intimate admixture with each other.

11. The herein described method of manufacturing a fixed volume high refractory brick which consists of burning silica material to its expansive limit and intimately mixing this expanded silica product with high alumina fire clay then reburning in intimate mixture with each other.

12. The herein described method of manufacturing a fixed volume high refractory substance of silica which consists of forming a gaseous conversion atmosphere independently of the refractory material being treated and burning said material in said atmosphere.

13. The herein described method of manufacturing a fixed volume high refractory substance which consists of burning a silica material in a kiln the atmosphere of which is charged with a gaseous catalyzer formed independently of the material being treated.

14. A high refractory product comprising tridymite in granular form resulting from the burning of a silica stone commonly denominated millstone grit.

15. The herein described process which consists of mixing a ground silica with milk of lime and letting the material stand until the lime has begun to set, then screening the material in which setting has begun whereby the material is reduced to a divided condition and its volume is increased and it is rendered spongy and plastic and burning the same in the presence of a gaseous catalyzer to reduce it to tridymite, then reducing the tridymite to powdered form, mixing the tridymite with a homogeneous clay of high alumina content which has been reduced to a plastic state and then reburning the whole.

16. The herein described process which consists of grinding a silica material to pass a 20 mesh screen, adding milk of lime and letting the material stand until the lime has begun to set, then screening the material in which setting has begun whereby the material is reduced to a divided condition and its volume is increased and it is rendered spongy and plastic and burning the same in the presence of a gaseous catalyzer to reduce it to tridymite, then reducing the tridymite to powdered form, mixing the tridymite with a homogeneous clay of high alumina content which has been reduced to a plastic state and then reburning the whole.

17. The herein described method of manufacturing a fixed volume high refractory substance which consists of burning a silica material in the presence of an atmosphere charged with a catalyzer, burning first under reducing conditions and finishing under oxidizing conditions.

18. The herein described method of manufacturing a fixed volume high refractory substance which consists of burning a silica material in the presence of an atmosphere charged with $P_2O_5$ gas until said silica has been converted to tridymite.

19. The herein described method of manufacturing a fixed volume high refractory product consisting of bonding tridymite, formed by burning silica material in the presence of an atmosphere charged with $P_2O_5$ gas, with a bonding agent of high alumina content and then reburning the same.

In testimony whereof I hereunto affix my signature.

CHARLES JAMES CRAWFORD.